UNITED STATES PATENT OFFICE.

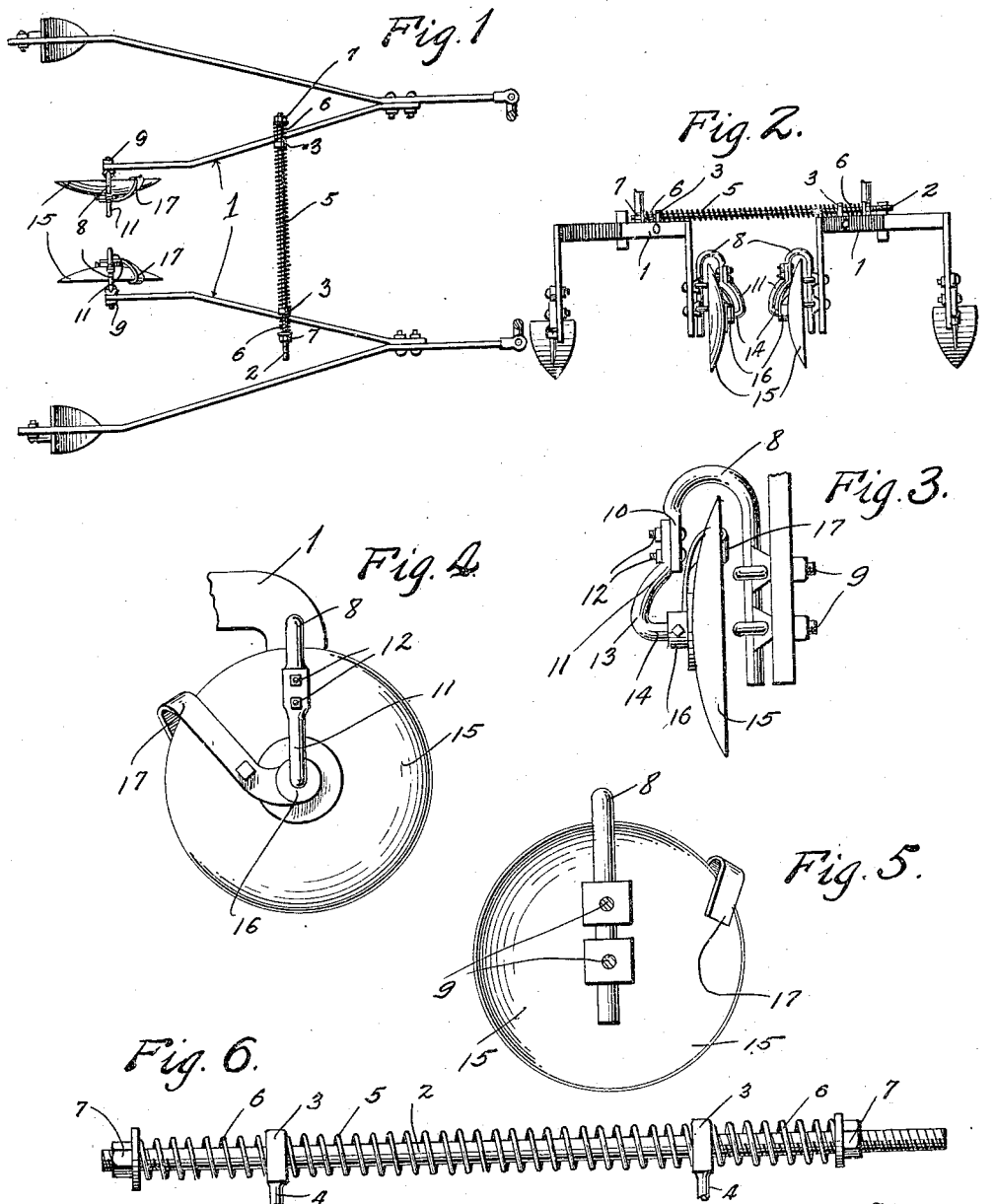

WILLIAM L. BALLARD, OF VERMILION, SOUTH DAKOTA.

SUPPORT FOR CULTIVATOR-DISKS.

1,296,452.  Specification of Letters Patent.  Patented Mar. 4, 1919.

Application filed November 26, 1917. Serial No. 203,989.

*To all whom it may concern:*

Be it known that I, WILLIAM L. BALLARD, a citizen of the United States, residing at Vermilion, in the county of Clay, State of South Dakota, have invented certain new and useful Improvements in Supports for Cultivator-Disks; and I do hereby declare the following to be a full, clear, and exact description of the invention, such as will enable others skilled in the art to which it appertains to make and use the same.

This invention relates to disk cultivators and has for its object to provide an improved mounting for the cultivator disks.

In the drawings:—

Figure 1 is a plan view of a cultivator constructed in accordance with my invention, Fig. 2 is a rear view of the cultivator, Fig. 3 is an enlarged view of a cultivator disk mounted in accordance with my invention, Fig. 4 is a side view thereof, Fig. 5 is a view of the opposite side, and Fig. 6 is an enlarged view of the spring arch.

Referring more particularly to the drawings, 1 represents the cultivator beams which are downturned in the usual manner for the attachment of shovel or disk cultivating elements.

Mounted across the beams 1 is a transverse bar 2 which is slidable in a pair of collars 3. The collars 3 are provided with shanks 4 which are clamped to or entered into the beams 1, so that the rod 2 may slide relatively to the beams. Between the collars 3 a coil spring 5 is mounted upon the rod 2, so that its ends expand against the collars 3. Also, there is threaded upon the rod 2 outside of the collars 3 the coil springs 6 which are expanded between the outer faces of the collars 3, and nuts 7 which are threaded upon the extremities of the rod 2.

By reason of the spring pressure which is exerted upon the opposite sides of the collars 3, the beams 1 to which they are attached are held with equalized pressures upon their opposite sides into the proper lines of action, but are permitted to compensate for the crowding of the cultivating implements, particularly where they are cultivator disks.

In further carrying out my invention, I provide a peculiar form of supporting bracket for the disks, by which the disks are mounted with particular efficiency for cultivating purposes. Thus, a bracket member 8 is mounted by means of eye bolts 9 upon the cultivator beam, the bracket member 8 consisting of a vertical shank which turns outwardly at its upper end in goose neck formation, and then, at its horizontal extremity is downturned and flattened into an attachment plate 10. A bearing member 11 having an upper vertical plate-like shank 12 which corresponds to the element 10 and is adapted to be bolted thereto, has its intermediate portion bowed as at 13 and its lower extremity inturned into horizontal relation to provide the bearing stub 14. Upon the stub 14 is mounted the disk 15 through the medium of an ordinary disk bearing 16. Also mounted upon the stub 14 and held in position by the disk bearing, is a scraper 17, which then curves around the edge of the disk, and operates upon its concave face.

The cultivator mechanism which has been described, provides a practical and efficient means for lessening the jar on the cultivator disks, in that they are permitted to crowd to a certain extent, when passing through unduly hard sections of soil or rocky formations.

What I claim as my invention is:—

1. In a cultivator, the combination with a draft beam, of a J-shaped bar, means for securing the shank of said bar to the draft beam, a second bar having a laterally extending journal shaft at one end, means for detachably securing the other end of the bar to the first named bar and a disk journaled on the shaft between the bars.

2. In a cultivator, the combination with a draft beam, of a J-shaped bar, means for securing the shank of said bar to the draft beam, a second bar including a laterally directed shaft portion at one end, the other end portion of the bar being offset toward said shaft portion, means for detachably securing said other end of the bar to the J-shaped bar, a disk journaled on the shaft portion, a collar fixed on the shaft portion between the disk and the major portion of the bar, and a scraper plate carried by said collar.

In testimony whereof, I affix my signature in the presence of two witnesses.

WILLIAM L. BALLARD.

Witnesses:
C. J. GUNDERSON,
A. B. GUNDERSON.

Copies of this patent may be obtained for five cents each, by addressing the "Commissioner of Patents, Washington, D. C."